United States Patent
Yamabuchi et al.

[11] Patent Number: 5,963,394
[45] Date of Patent: Oct. 5, 1999

[54] MAGNETIC RECORDING REPRODUCING APPARATUS WITH BOTTOM EDGE OF TAPE ABOVE TAPE LEAD GROOVE, BEFORE DURING AND AFTER LOADING OF TAPE ONTO DRUM

[75] Inventors: Koji Yamabuchi, Nara; Mitsunobu Yoshida, Tenri; Hideshi Ohtsuka, Yamatokoriyama, all of Japan

[73] Assignee: Sharp Kabushiki Kaisha, Osaka, Japan

[21] Appl. No.: 08/806,616

[22] Filed: Feb. 26, 1997

Related U.S. Application Data

[63] Continuation of application No. 08/407,632, Mar. 21, 1995, abandoned.

[30] Foreign Application Priority Data

Mar. 23, 1994 [JP] Japan ..................................... 6-052131

[51] Int. Cl.⁶ .............................................. G11B 15/665
[52] U.S. Cl. .............................................................. 360/85
[58] Field of Search ................................. 360/85, 95, 87, 360/90, 93, 96.1–96.4; 242/340–341, 352, 354

[56] References Cited

U.S. PATENT DOCUMENTS

| | | | |
|---|---|---|---|
| 5,041,928 | 8/1991 | Sasaki et al. | 360/85 |
| 5,115,361 | 5/1992 | Terayama et al. | 360/85 |
| 5,124,862 | 6/1992 | Sawano et al. | 360/85 |
| 5,278,707 | 1/1994 | Tsuchiya et al. | 360/85 |
| 5,321,567 | 6/1994 | Kano et al. | 360/85 |
| 5,361,180 | 11/1994 | Yamabuchi et al. | 360/95 |
| 5,369,536 | 11/1994 | Konishi et al. | 360/85 |
| 5,373,404 | 12/1994 | Katou et al. | 360/77.02 |
| 5,426,546 | 6/1995 | Tomitaka et al. | 360/85 |
| 5,523,906 | 6/1996 | Ando et al. | 360/85 |

FOREIGN PATENT DOCUMENTS

| | | |
|---|---|---|
| 0083932 | 7/1983 | European Pat. Off. . |
| 0127447 | 12/1984 | European Pat. Off. . |
| 0442525 | 8/1991 | European Pat. Off. . |
| 0554088 | 8/1993 | European Pat. Off. . |
| 57-191865 | 11/1982 | Japan . |
| 57-212649 | 12/1982 | Japan . |
| 57-212651 | 12/1982 | Japan . |
| 4205844 | 7/1992 | Japan . |
| 0536169 | 2/1993 | Japan . |

OTHER PUBLICATIONS

Abstract of JP–A–57 191865, (Hitachi Seisakusho K.K.), Patent Abstracts of Japan, vol. 7, No. 42 (p–177), Feb. 19, 1983.

*Primary Examiner*—Brian E. Miller

[57] ABSTRACT

The magnetic recording reproducing apparatus is of a type in which magnetic tape is loaded approximately parallel to a reference plane of a cassette, and in a tape guide group on magnetic tape take up side of a rotary head drum, a first take up side inclined guide on which magnetic tape is wound around immediately after it moves away from rotary head, a take up side guide roller arranged downstream and a second take up side inclined guide are included. Height of a lead formed at a fixed portion of rotary head drum is set such that it becomes lower than the lower end of the magnetic tape for its entire region, at the time of loading and unloading of the magnetic tape. By this structure, contact between the lower end of the magnetic tape and the edge of the lead at the time of loading and unloading of the magnetic tape can be avoided, and therefore damage on the magnetic tape caused by the lead edge can be prevented, and the life of the tape can be made longer.

20 Claims, 11 Drawing Sheets

MAGNETIC RECORDING REPRODUCING APPARATUS WITH BOTTOM EDGE OF TAPE ABOVE TAPE LEAD GROOVE, BEFORE DURING AND AFTER LOADING OF TAPE ONTO DRUM

This application is a continuation of application Ser. No. 08/407,632 filed on Mar. 21, 1995, now abandoned.

BACKGROUND OF THE INVENTION

1. Field of the Invention

The present invention relates to a so called helical scan type magnetic recording reproducing apparatus used for a video cassette recorder (VCR), digital audio tape recorder (DAT) or the like in which information is recorded/reproduced on a magnetic tape with a predetermined angle of inclination with respect to longitudinal direction of the tape. More specifically, the present invention relates to a magnetic recording reproducing apparatus in which loading and unloading of a magnetic tape are effected in a plane approximately parallel to a reference plane of a cassette, which is a plane formed by a center line of the magnetic tape when it is contained in a tape cassette.

2. Description of the Background Art

So called helical scan type tape travelling systems in which magnetic tape is travelled obliquely wound around a rotary drum can be classified into various loading methods, dependent on the angle of inclination of the drum, the direction of inclination, reference height, arrangement of tape guides and so on. A so called M loading method is a representative loading method in the helical scan type, which is employed in VHS, 8 mm VCR or in an R (Rotary)-DAT. A conventional tape driving system employing M loading method will be described with reference to FIGS. 8A and 8B.

In the conventional tape traveling system of M loading type, referring to FIG. 8A, a magnetic tape 2 going out from a supply reel 1a in a tape cassette 1 passes over a tension roller 12, an impedance roller (hereinafter referred to as "SI roller") 14 on the tape supply side, and a guide roller 16 on the supply side, and the tape traveling plane is inclined by an inclined guide 18 of the supply side. Thereafter, magnetic tape 2 travels wound helically on a rotary head drum 3 which is inclined in the direction shown by the arrow A of FIG. 8A, and magnetic signal is recorded/reproduced by rotary head drum 3. Magnetic tape 2 going away from rotary head drum 3 travels with its plane returned from the inclined state to the state allowing accommodation in the tape cassette by means of inclined guide 22 on the take up side, passes over guide roller 24 on the take up side, and travels at a constant speed between capstan 4 and pinch roller 5. Thereafter, magnetic tape 2 passes around guide 28 and wound around take up reel 1b.

The magnetic recording reproducing apparatus of the M loading method is advantageous in that the number of parts is small as the tape traveling system is relatively simple, and that the mechanism can be made thin, since loading of tape guides and the like is performed approximately parallel to the reference plane of the cassette. Details of such magnetic recording reproducing apparatus of the M loading method is disclosed in Japanese Patent Laying-Open No. 57-212651.

However, in the above described conventional magnetic recording reproducing apparatus of the M loading method, the height of lead 3a provided on the side of a fixed portion of rotary head drum 3 becomes higher than the lower end of a magnetic tape contained in tape cassette in the take up side region of the magnetic tape (on the side where magnetic tape goes away from the rotary head drum during traveling for recording/reproducing), as shown in FIG. 8B. Therefore, when the magnetic tape is to be loaded and unloaded approximately parallel to the reference plane of the cassette, the lower end of the magnetic tape may possibly be in contact with the edge of lead 3a, damaging the magnetic tape. Especially at the time of unloading the magnetic tape, magnetic tape 2 is pinched between lead 3a and a flange 24a of guide roller 24 on the take up side which regulates the height of the tape, and therefore the lower end of magnetic tape 2 may be damaged considerably.

Japanese Patent Laying-Open Nos. 57-191865 and 57-212649 disclose magnetic recording reproducing apparatus employing the above described M loading method in which rotary head drum 3 is slightly inclined to the side of the tape cassette so as to suppress increase in tape tension during traveling of the magnetic tape. In the magnetic recording reproducing apparatus disclosed in these laid-open applications, rotary head drum 3 is slightly inclined to the side of the tape cassette as compared with the above described conventional M loading method, whereby the tape winding angle around the inclined guide 18 on the supply side is made larger than the tape winding angle around the inclined guide 22 on the take up side, so that increase in tension of the magnetic tape 2 at the inclined guide 22 on the take up side, the tension value of which has been regulated on the supply side of rotary head drum 3, can be suppressed. As a result, load in winding the tape at capstan 4 can be reduced, and power consumption can be suppressed. As rotary head drum 3 is slightly inclined to the side of tape cassette 1 in this method, the position of lead 3a is also made slightly lower, as shown in FIG. 9B (or FIG.10B). However, even in this method, contact of the lower end of the magnetic tape 2 and the edge of lead 3a at loading and unloading of the magnetic tape is unavoidable, and therefore the tape edge is inevitably damaged. More specifically, the lead 3a is still not low enough, and in order to further lower the lead, it is necessary to increase the angle of inclination of rotary head drum 3 toward the side of tape cassette 1. However, if rotary head drum 3 is inclined to that extent, the winding angle of the magnetic tape around inclined guide 22 on the take up side cannot be ensured, and the tape traveling system cannot be implemented.

The problems of the above described conventional M loading method and of the magnetic recording reproducing apparatus disclosed in Japanese Patent Laying-Open No. 57-191865 and so on will be summarized, with reference to FIGS. 10A and 10B. Positional relation between lead 3a and the lower edge of the magnetic tape at the time of loading and unloading of the magnetic tape in the conventional M loading method shown in FIGS. 8A and 8B is illustrated in FIG. 10A. The line denoted by the arrow B of FIG. 10A indicates the position of the lower end of the magnetic tape accommodated in the tape cassette and the hatched region indicates the region of the magnetic tape which moves wound around rotary head drum 3 at the time of loading and unloading. As can be seen from this figure, at the time of loading and unloading of the magnetic tape, lead 3a is positioned above the lower end of the magnetic tape on the tape take up side region of rotary drum 3, so that the lower end of the magnetic tape and the edge of lead 3a cross and are in contact with each other. Therefore, the lower end of the magnetic tape is damaged by the edge of lead 3a.

The positional relation in the loading method disclosed, for example, in Japanese Patent Laying-Open No. 57-191865 which corresponds to FIG. 10A, is illustrated in FIG. 10B. As can be seen from this figure, in this method, lead 3a as a whole is lowered, as rotary head drum 3 is slightly inclined to the side of the tape cassette. However, contact between the lower end of the magnetic tape and the edge of lead 3a at the time of loading and unloading of the magnetic tape is still unavoidable.

Meanwhile, in order to avoid the damage at the lower end of the magnetic tape caused by the lead of the rotary head drum, Japanese Patent Laying-Open No. 4-205844, for example, proposes notching part or all of the lead, so that contact of the lower end of the magnetic tape with the edge of the lead at the time of loading and unloading of the magnetic tape is prevented. However, as it is desirable to guide the lower end of the traveling magnetic tape by providing a lead in the entire region of the rotary head drum where the magnetic tape is wound in order to ensure format compatibility or track linearity, it is not preferable to notch even a portion of the lead in order to avoid contact between the magnetic tape and the lead.

Especially, the magnetic tape becomes thinner and thinner recently and the lower end of the magnetic tape becomes more susceptible to damage. Therefore, solution of the above described conventional problem has been strongly desired.

Japanese Patent Laying Open No. 5-36169 discloses a prior art example of the helical scan type magnetic recording reproducing apparatus in which two inclined guides are included in the guide group on the take up side. In the magnetic recording reproducing apparatus disclosed in this article, referring to FIG. 11A, magnetic tape 2 going out from the tape cassette travels passing through inclined guide 118 on the supply side, first and second guide rollers on the supply side, and is helically wound around rotary head drum 103. Magnetic tape 2 moving away from rotary head drum 103 is first wound around first guide roller 124 on the take up side, passes through first inclined guide 122 on the take up side and passes guide roller 125, inclined guide 126 and extracting guide roller 127 on the take up side, travels at a constant speed pinched between capstan 104 and pinch roller 105, and returns to the tape cassette.

Though two inclined guides are provided on the tape take up side in this magnetic recording reproducing apparatus, these are provided merely to suppress tape tension by reducing winding angle of magnetic tape over the guides and the purpose of providing these two guides is not to avoid contact between the lead and the magnetic tape, which is the object of the present invention to be described later.

In the magnetic recording reproducing apparatus of this article, the second guide roller 117 on the supply side is arranged immediately before magnetic tape 2 is wound around rotary head drum 103, and the first guide roller 124 on the take up side is provided immediately after the tape moves away from rotary head drum 103 in order to attain the above described objects, which is different from that of the present invention. When a tape traveling system is implemented with the guide rollers arranged in this manner, as can be seen from FIG. 11B, there is a large gap between the position of the second guide roller 117 on the supply side and the first guide roller 124 on the take up side, and thus the resulting system is far from parallel loading to which the present invention is applied.

Therefore, as will become apparent after reading the rest of this disclosure, even those skilled in the art cannot readily attain the object of the present invention by simply combining the structure of the tape guides of the magnetic recording reproducing apparatus disclosed in the aforementioned laid-open patent application with the conventional magnetic recording reproducing apparatus employing M loading method.

SUMMARY OF THE INVENTION

An object of the present invention is to provide a magnetic recording reproducing apparatus which can minimize damage on the magnetic tape at the time of loading and unloading of the magnetic tape, and which allows reduction in size to about the same extent as the conventional apparatus of the M loading method.

The above described problem can be solved by the magnetic recording reproducing apparatus in accordance with an aspect of the present invention which includes a rotary head drum having a rotary portion on which a magnetic head for recording and reproducing on the magnetic head is attached and a fixed portion on which a lead for guiding the lower end of the magnetic tape is attached, and tape guide groups for the supply side and for the take up side provided on the tape supply side and the tape take up side of the rotary head drum, respectively, for winding the magnetic tape obliquely over a prescribed angle, on an outer peripheral surface of the rotary head drum. The guide roller on the supply side and the inclined guide on the supply side included in the tape guide group on the supply side are fixed on a pole base on the supply side, while the guide roller on the take up side and a first inclined guide on the take up side included in the guide group of the take up side are fixed on a pole base on the take up side.

The supply side and take up side pole bases are guided by guide rails such that they move in a direction approximately parallel to the reference plane of the cassette, which is the plane provided by the center line of the magnetic tape when it is accommodated in the tape cassette.

The feature of this apparatus resides in that the inclined guide for the take up side included in the tape guide group on the take up side is provided at a position where the magnetic tape wound around the rotary head drum is wound immediately after it moves away from the rotary head drum; that a second inclined guide on the take up side for returning the state of the magnetic tape which is running inclined to a state which allows accommodation in the tape cassette, is provided to be in contact with the magnetic recording surface of the magnetic tape; that the guide roller on the take up side and the second inclined guide on the take up side are provided in this order in the direction of travel of the magnetic tape in recording and reproducing, downstream the first inclined guide for the take up side; and that the rotation axis of rotary head drum is inclined to the direction of the tape cassette so that the height of the lead in entire region, made lower than the position of the lower end of the magnetic tape at the time of loading and unloading of the magnetic tape.

In the magnetic recording reproducing apparatus of the present invention structured as described above, the first inclined guide on the take up side is positioned where the magnetic tape is wound immediately after the tape goes away from rotary head drum, and the guide roller on the take up side and the second inclined guide on the take up side are arranged in the downstream side, whereby loading and unloading of the magnetic tape can be performed still approximately parallel to the reference plane of the cassette, while the angle of inclination of the magnetic tape when it is wound around the rotary head drum can be sufficiently enlarged. Therefore, as the rotary head drum is inclined greater than in the prior art to the side of the tape cassette and lowering the position of the lead, the height of the lead can be made lower than the lower end of the magnetic tape for the entire region, at the time of loading and unloading of the magnetic tape. As a result, contact of the lower end of the magnetic tape with the edge of the lead can be prevented at the time of loading and unloading of the magnetic tape, damage to the magnetic tape can be avoided, and the life of the magnetic tape can be increased. The effects provided by the present invention are significant in view of the current trend of making thinner the magnetic tape.

In order to set the height of the lead lower than the lower end of the magnetic tape for the entire region at the time of loading and unloading of the magnetic tape, the apparatus should have, in addition to the above described structure, such a structure in that the height of the lead is made lower than the position which is higher by the amount of elevation of the pole bases on the supply side and on the take up side derived from tape tension at the time of loading and unloading of the magnetic tape, from the roller end of the magnetic tape accommodated in the tape cassette for the entire region. Lowering of the height of the lead can be minimized as the amount of elevation derived from tape tension of the magnetic tape and the idling of the pole base are taken into consideration.

According to another aspect, the magnetic recording reproducing apparatus of the present invention includes, as basic components, a rotary head drum, a tape guide group on the supply side, a tape guide group on the take up side, pole bases on the supply side and on the take up side and a guide rail which are common to the magnetic recording reproducing apparatus described above, and the position of the lead is adapted to be lower than a position which is higher than the lower end of the magnetic tape accommodated in the cassette by an amount of elevation of the pole bases on the supply side and the take up side caused by tape tension at the time of loading and unloading of the magnetic tape. By the magnetic recording reproducing apparatus having the above described structure, parallel loading in which the first and second pole bases move approximately parallel to the reference plane of the cassette along the guide rail is employed, and the lower end of the magnetic tape is always positioned above the lead at the time of loading and unloading of the magnetic tape. Therefore, at the time of loading and unloading of the magnetic tape, the magnetic tape is drawn out from the tape cassette approximately parallel to the reference plane of the cassette, and the lower end of the magnetic tape is maintained higher than the lead, so that it will not be in contact with the edge of the lead. Therefore, damage on the magnetic tape by the edge of the lead can be prevented and the life of the magnetic tape can be made longer.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1A:
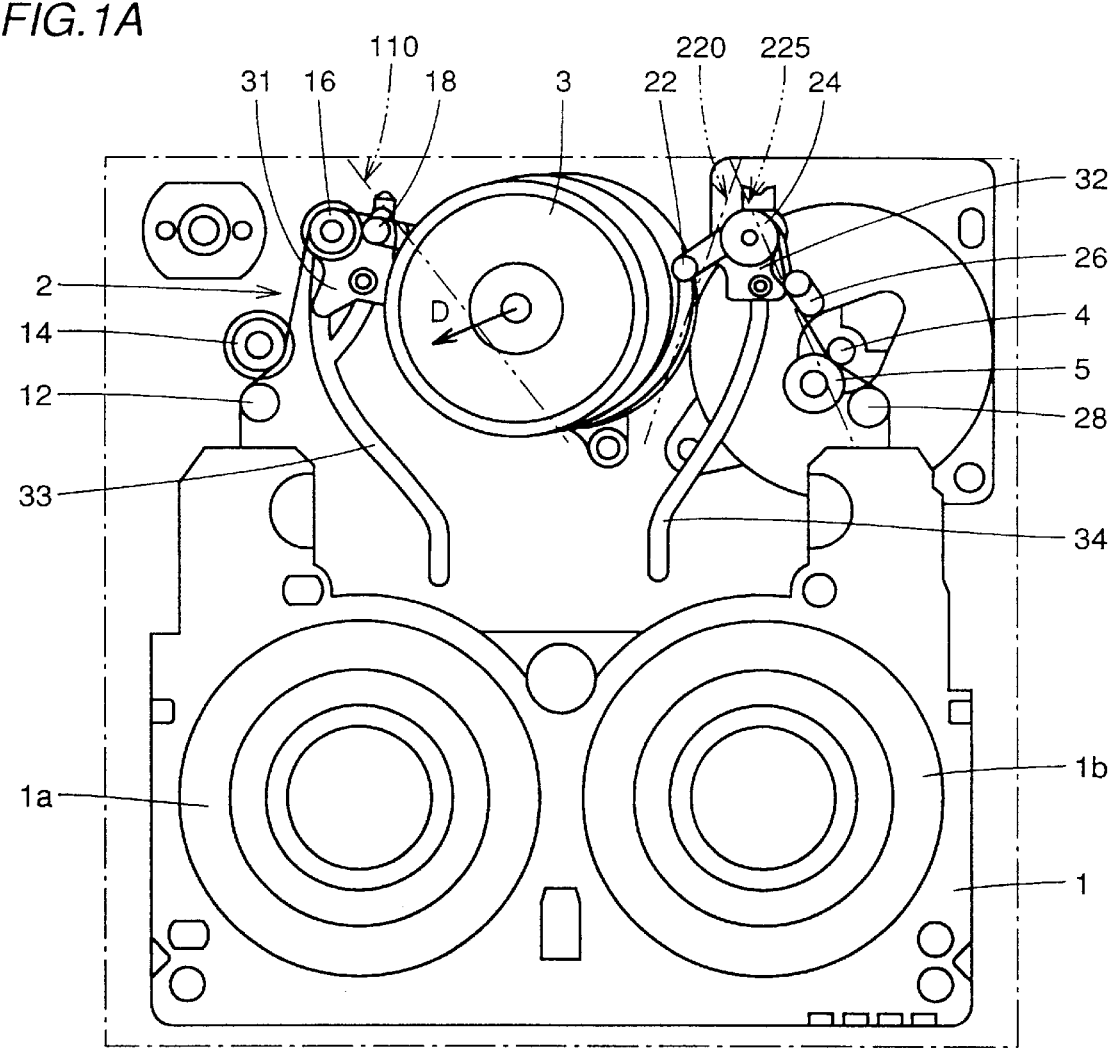
FIG. 1A is a plan view of the tape traveling system of the magnetic recording reproducing apparatus in accordance with one embodiment of the present invention.

One embodiment of the present invention will be described with reference to the figures. In the tape traveling system of the magnetic recording reproducing apparatus in accordance with one embodiment of the present invention, referring to FIGS. 1A, 1B and FIG. 2, magnetic tape 2 accommodated in tape cassette 1 shown in FIG. 2 exits supply reel 1a in tape cassette 1, passes over tension roller 12, SI roller 14 and guide roller 16 on the supply side, and tape traveling plane is inclined by inclined guide 18 on the supply side so that the tape can be wound around rotary head drum 3. Thereafter, magnetic tape 2 travels helically wound over rotary head drum 3 which is arranged inclined and by rotary head drum 3, magnetic signal is recorded/reproduced. Magnetic tape 2 moving away from rotary head drum 3 has its angle of inclination of the tape traveling plane changed once by the first inclined guide 22 on the take up side, so that the angle of inclination almost allows accommodation of the tape in tape cassette 1. Thereafter, the tape passes over guide roller 24 on the take up side, the tape traveling plane has its inclination returned to the angle completely allowing accommodation in tape cassette 1 by second inclined guide 26 on the take up side, then the tape travels at a constant speed between capstan and pinch roller 5, passes over roller 28 and, wound around take up reel 1b.

Figure 2:
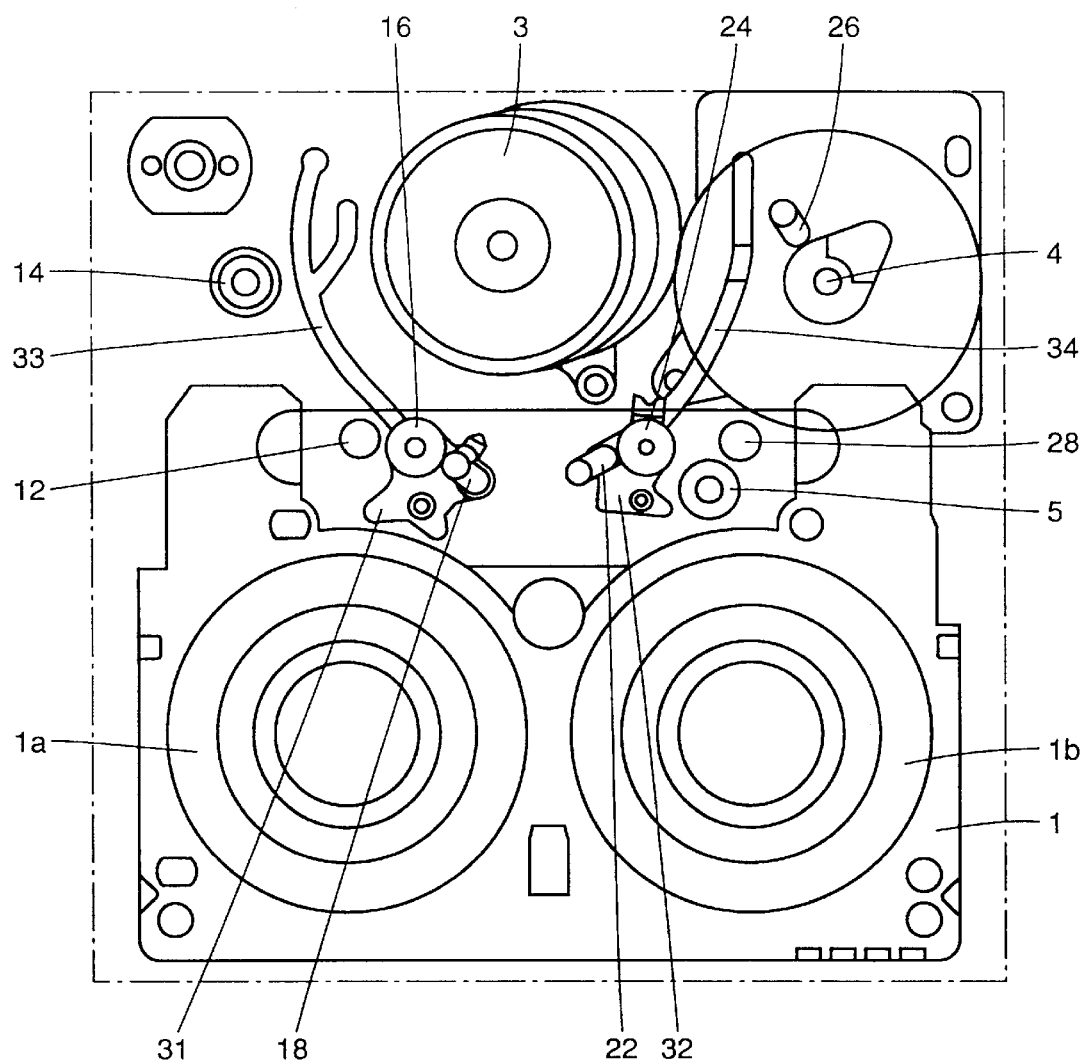
FIG. 2 shows a state in which magnetic tape is accommodated in a tape cassette, that is, the state upon completion of unloading of the tape traveling system of the magnetic recording reproducing apparatus of the present embodiment shown in FIG. 1.
Figure 8A:
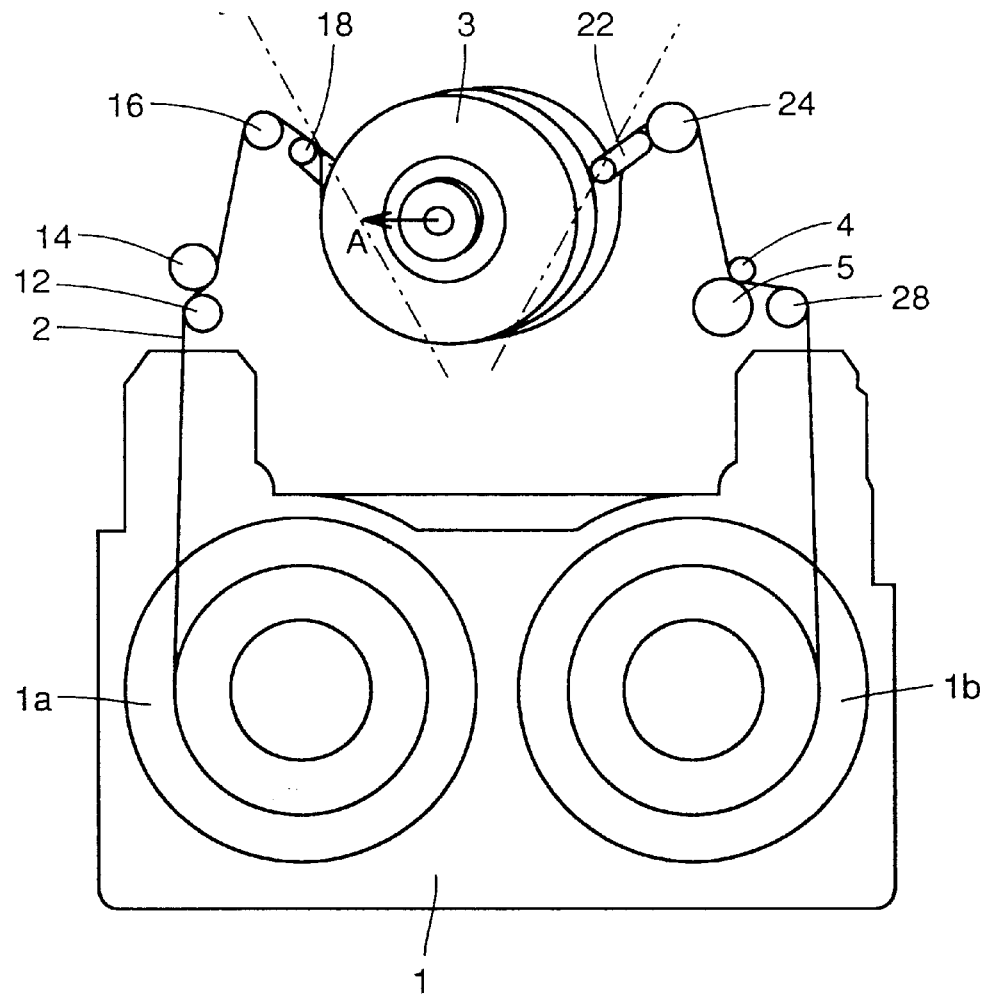
FIG. 8A is a plan view schematically showing tape traveling system of a conventional magnetic recording reproducing apparatus of the M loading method.
Figure 8B:
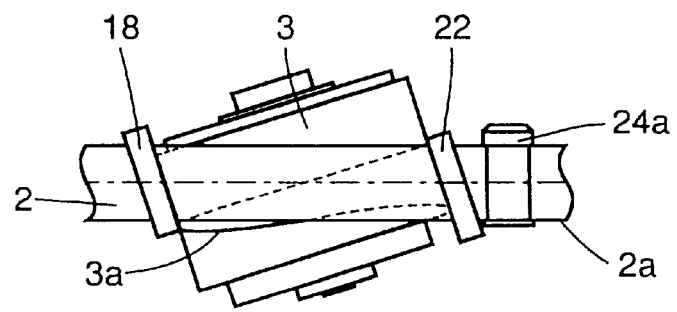
FIG. 8B is a front view showing only a portion near the rotary head drum of the conventional apparatus.
Figure 9A:
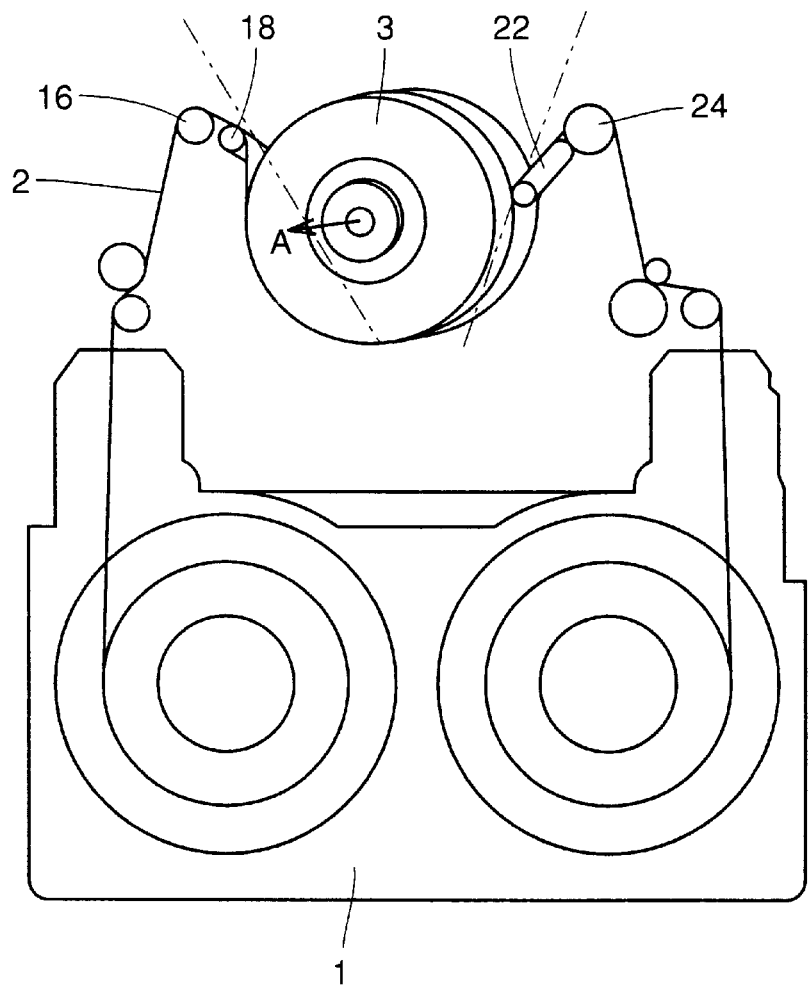
FIG. 9A is a plan view showing a conventional example disclosed, for example, in Japanese Patent Laying-Open No. 57-191865, in which the rotary head drum is further inclined to the side of the tape cassette than in the conventional M loading method.
Figure 9B:
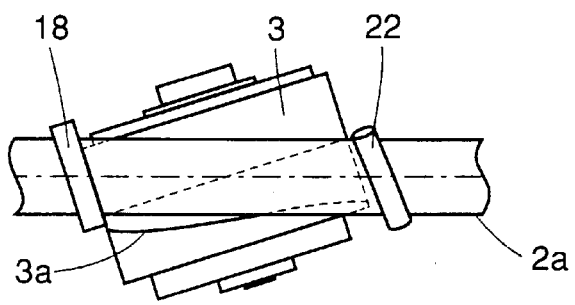
FIG. 9B is a front view showing in enlargement a portion near the rotary head drum.
Figure 10A:
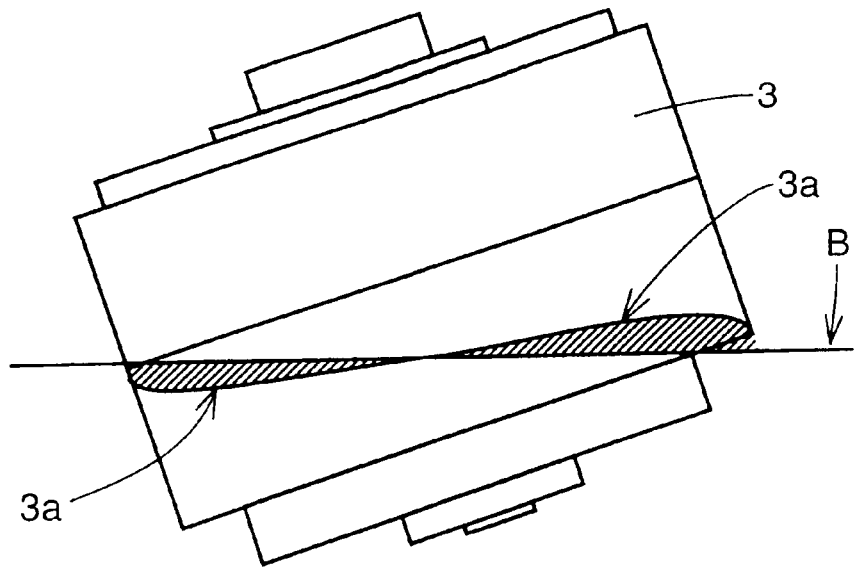
FIG. 10A is an illustration showing positional relation between the lead and the moving region of the lower end of the magnetic tape at the time of loading and unloading, in the conventional tape traveling system of M loading method.
Figure 10B:
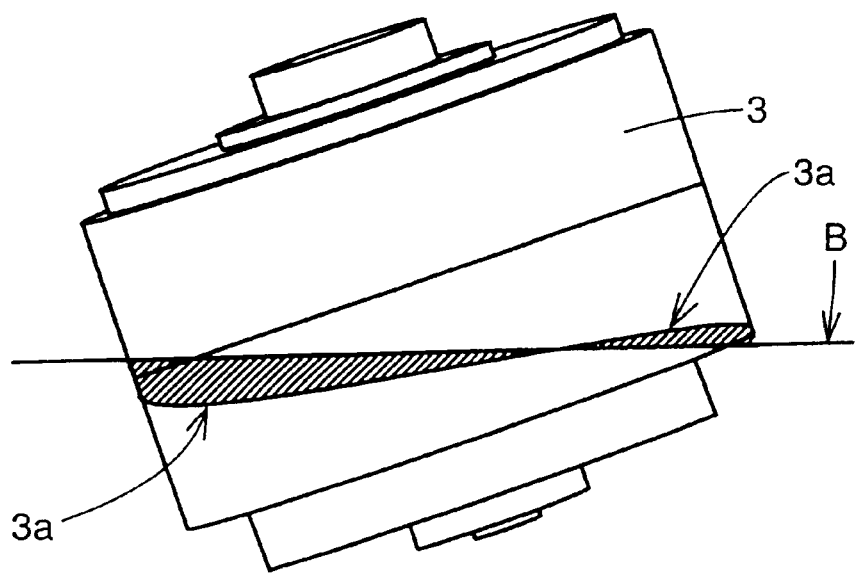
FIG. 10B is an illustration showing positional relation corresponding to FIG. 10A, of the conventional example shown in FIG. 9.
Figure 11A:
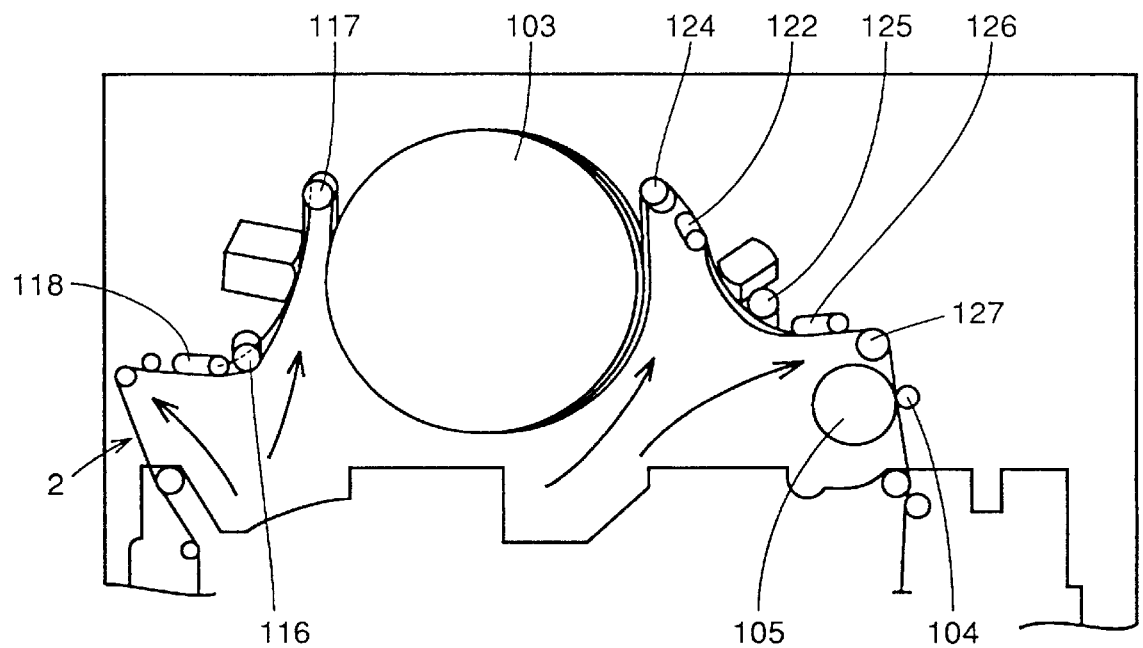
FIG. 11A is an plan view showing the tape traveling system of the conventional magnetic recording reproducing apparatus disclosed in Japanese Patent Laying-Open No. 5-36169.
Figure 11B:
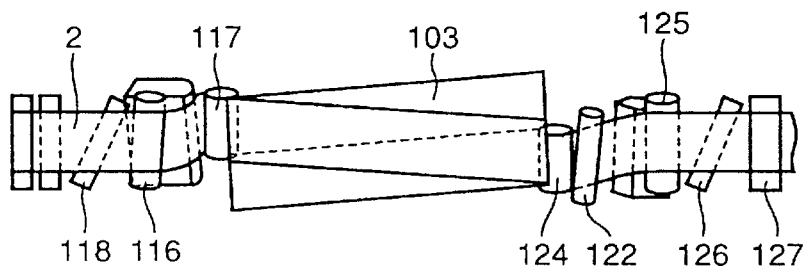
FIG. 11B is a front view showing a portion near the rotary head drum.

As for the angle of inclination of rotary head drum 3 in the present embodiment (arrow D; FIG. 1A) compared with the conventional M loading method described above, the angle of inclination is approximately the same in the direction of arrow A (FIG. 8A) as in the conventional M loading method. In the direction of the tape cassette, it is inclined by 13° downward in FIG. 1A, and as a result, it has an angle of inclination of 18° in the direction of the arrow D. Since rotary head drum 3 has such an angle of inclination, if there is only one inclined guide, that is the first inclined guide 22 on the take up side provided on the take up side of rotary head drum 3, it is impossible to return the plane of tape traveling from the angle of inclination when it is traveling wound around rotary head drum 3 to the angle allowing accommodation to the tape cassette. Specifically, when the angle of inclination of the tape traveling plane is to be changed by large amount at one time by only one inclined guide on the take up side, it becomes necessary to enlarge the angle of inclination of the inclined guide, and as a result, winding angle of magnetic tape around the inclined guide cannot be ensured.

Figure 1B:
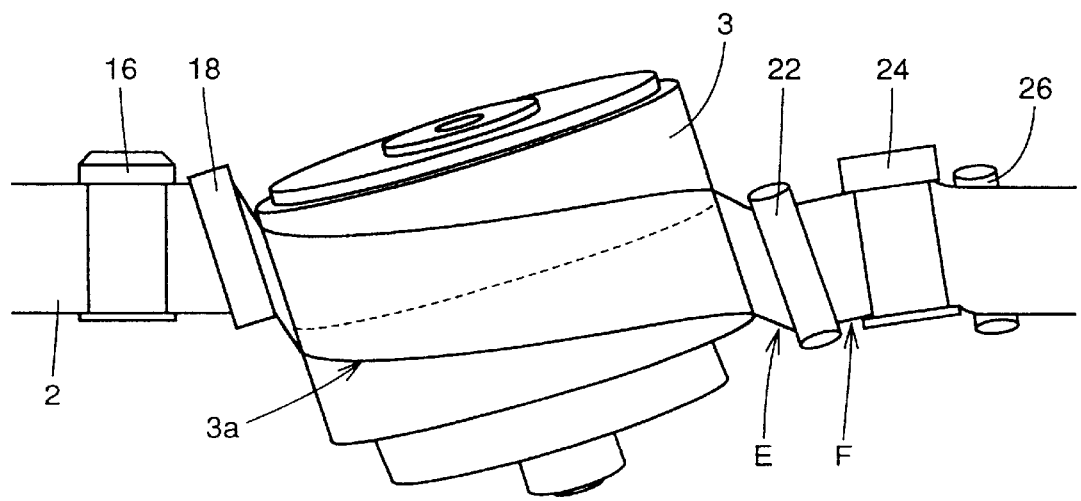
FIG. 1B is a front view showing, in enlargement, portions near the rotary head drum 3 of the tape traveling system of the apparatus shown in FIG. 1A.
Figure 6A:
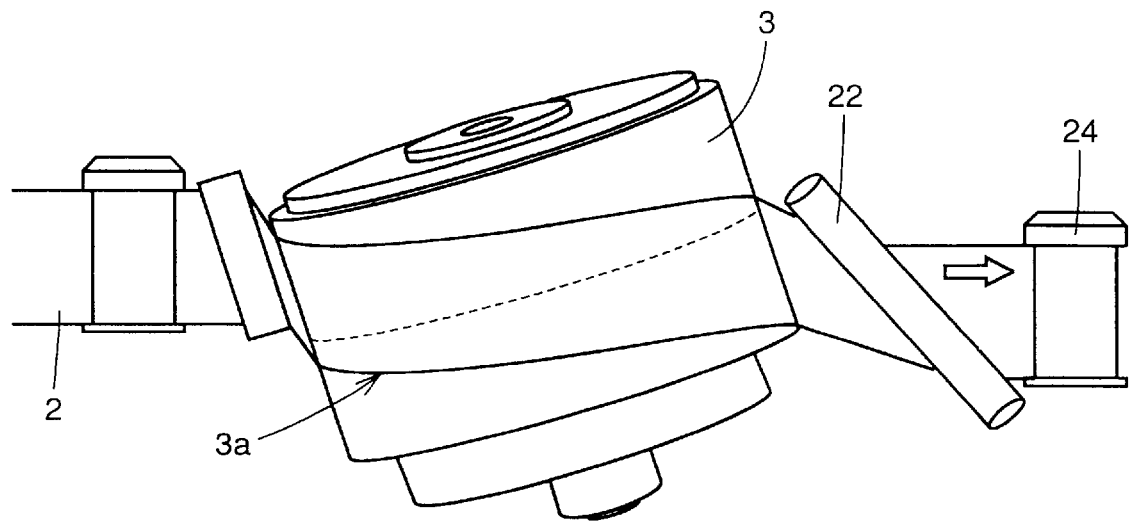
FIG. 6A is an illustration showing a state in which inclined magnetic tape is to be returned to the original state by one most inclined guide on the take up side when the rotary head drum is inclined to the side of the tape cassette in the embodiment of the present invention.
Figure 6B:
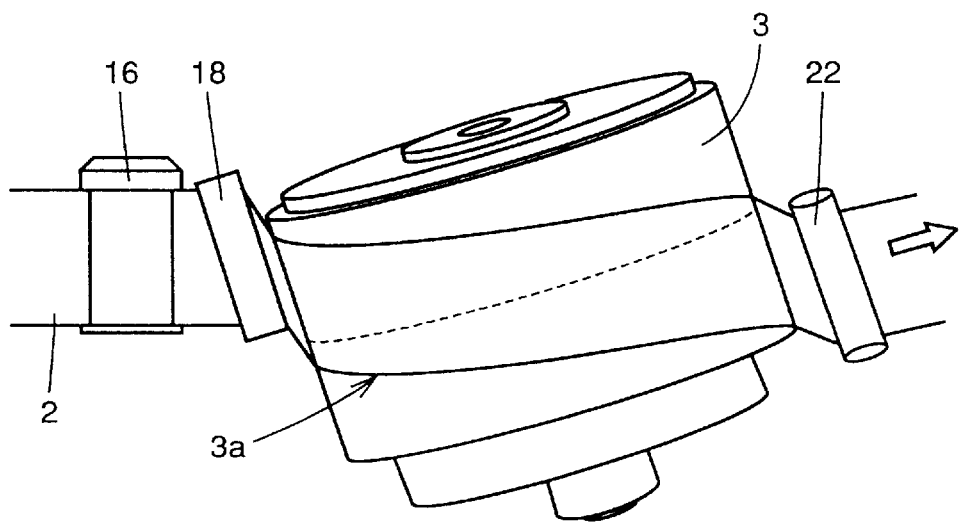
FIG. 6B is an illustration showing the state in which inclined magnetic tape is not returned to the original state by one inclined guide on the take up side is inclined by maximum amount possible.

The problem when rotary head drum 3 is much inclined to the side of tape cassette 1 so as to lower the position of lead 3a and the angle of inclination of the tape traveling plane is to be changed by only one inclined guide on the take up side as in the present embodiment will be described with reference to FIGS. 6A and 6B with comparison to FIG. 1B. When the tape traveling plane of tape 2 immediately after it moves away from rotary head drum 3 is to be returned to a direction vertical to the reference plane of the cassette only by the first inclined guide 22 on the take up side, there will be a step in the height of magnetic tape 2 on the supply side and the take up side of rotary head drum 3, as shown in FIG. 6A. Actually, if the first inclined guide 22 on the take up side is inclined to the state shown in FIG. 6A, winding angle of magnetic tape 2 around the first inclined guide 22 on the take up side cannot be ensured, and therefore it cannot be realized by the tape traveling system such as shown in FIG. 6A. When the angle of inclination of the first inclined guide 22 on the take up side is so set as to enable implementation of the tape traveling system, magnetic tape 2 which has passed wound around the first inclined guide 22 on the take up side is still inclined from the plane vertical to the reference plane of the cassette, and the direction of travel has an upward component.

Therefore, when rotary head drum 3 is inclined to the side of tape cassette 1 to lower lead 3a to attain the object of the present invention, only one inclined guide on the tape take up side is not sufficient.

Therefore, in the present embodiment, the angle of inclination of the first inclined guide 22 on the take up side is set to 21.6° (16.8° with respect to magnetic tape 2), and a second inclined guide 26 on the take up side is provided on the other side of guide roller 24 of the take up side. Thus the magnetic tape 2 traveling inclined and wound around rotary head drum 3 is returned so that the tape traveling plane can be wound around take up reel 1b of tape cassette 1 in two steps. Specifically, referring to FIG. 1B, with the inclination of rotary head drum 3 of the present embodiment, traveling magnetic tape 2 is positioned, immediately after it moves away from rotary head drum 3 (at a position denoted by arrow E in FIG. 1B), lower than the position when it is accommodated in the tape cassette, and the tape traveling vector has downward component. Therefore, the height of magnetic tape 2 cannot be returned to a state allowing accommodation to the tape cassette by means of first inclined guide 22 on the take up side only. Therefore, at first, upward component is provided in the vector of the tape traveling direction (the arrow F shown in FIG. 1B) by the first inclined guide 22 on the take up side, and then the magnetic tape is returned to a height high enough to allow accommodation in the tape cassette, by the second inclined guide 26 on the take up side.

Magnetic tape 2 is not yet returned to the state allowing accommodation to the tape cassette by the first inclined guide 22 on the take up side, and it is inclined with respect to a plane vertical to the reference plane of the cassette. Therefore, rotation axis of guide roller 24 on the take up side is also inclined from the direction vertical to the reference plane of the cassette. However, the angle of inclination is preferably at most 5°, and therefore pole base 32 on the take up side on which the first inclined guide 22 and guide roller 24 on the take up side are fixed can perform loading parallel to the reference plane of the cassette, immediately before positioning to the magnetic tape traveling state. Therefore, one of the advantages of M loading method, that is, facility in making thin the mechanism, can be maintained.

Generally, in order to return the magnetic tape with its tape traveling plane inclined from a direction vertical to the reference plane of the cassette to a direction vertical to the reference plane of the cassette, the inclined guide must be so arranged as to be approximately in contact with a line generally referred to as a cross line. The "cross line" means a line of crossing of the reference plane of the cassette and a traveling plane of the magnetic tape. In the tape traveling system of the present embodiment, in order to lower the position of lead 3a of rotary head drum 3, the rotation axis of rotary head drum 3 is inclined larger to the side of the tape cassette, that is, the direction of the arrow D of FIG. 1A leans toward the cassette more so than the direction A in the conventional M loading method. Therefore, on the supply side of rotary head drum 3, immediately before the magnetic tape 2 is wound around rotary head drum 3, the angle of tape traveling plane is changed by the inclined guide 18 on the supply side, with the angle being mirror reflection with respect to the supply side cross line 110. By contrast, on the take up side of rotary head drum 3, magnetic tape 2 traveling in the inclined state and moving away from rotary head drum 3 cannot intersect cross line 220 on the take up side. In other words, the tape traveling plane of magnetic tape 2 cannot be returned to a state allowing accommodation in the tape cassette directly only by means of the first inclined guide 22 on the take up side. However, by arranging the first inclined guide 22 on the take up side with an appropriate angle, the cross line 220 can be changed to a position denoted by a reference numeral 225, and therefore, as the tape passes over guide roller 24 on the take up side, tape traveling plane of the inclined magnetic tape 2 can be returned to the state allowing accommodation in the tape cassette.

By the structure of the tape traveling system of the present embodiment, the direction of inclination of the rotation axis of rotary head drum 3 can be much inclined to the side of the tape cassette as compared with the conventional M loading method described above, and therefore the position of lead 3a can be significantly lowered.

Figure 7:
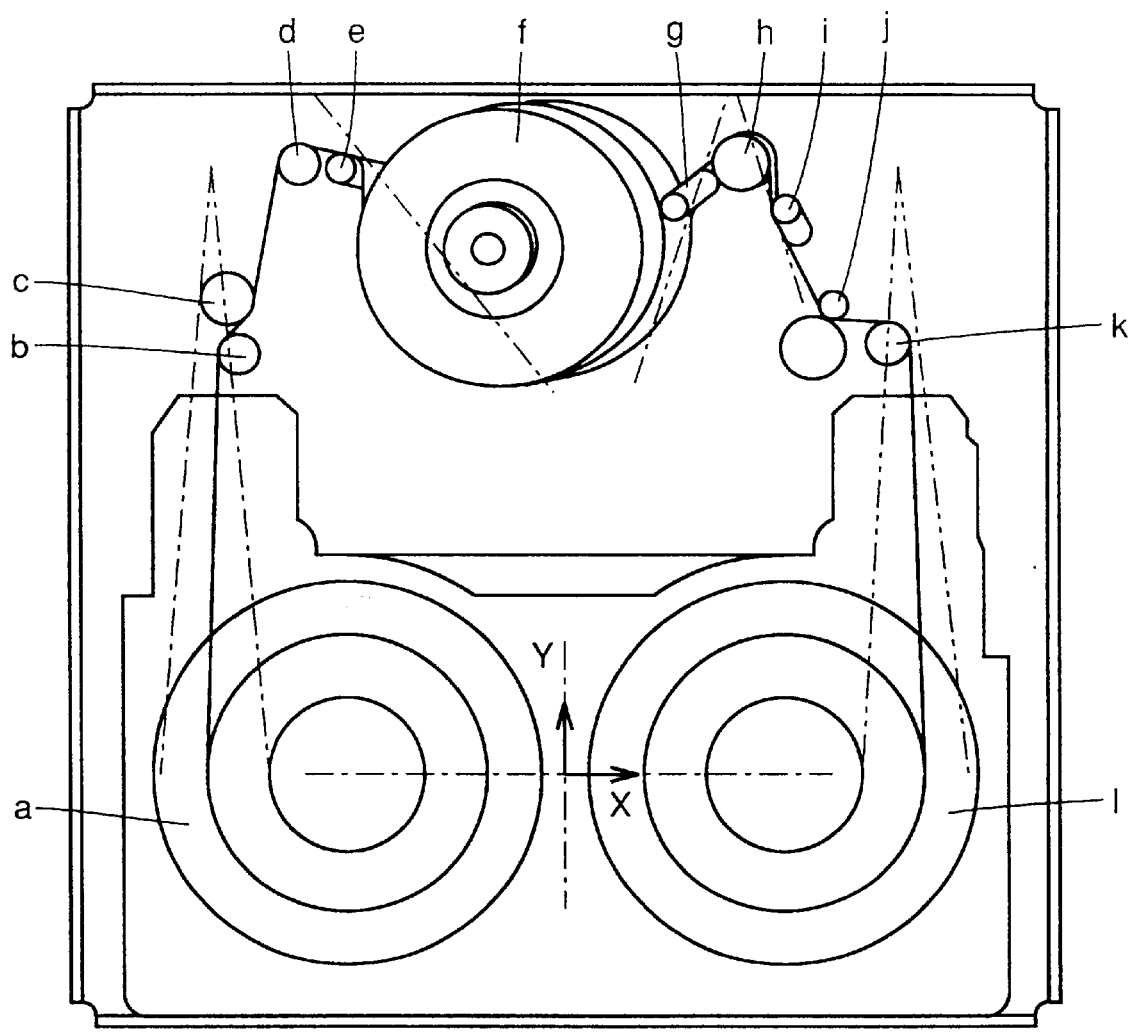
FIG. 7 is an illustration showing various references to help explain the numerical values of Table 1 in which specifications of various members of the traveling system in one embodiment of the present invention are given.

Detailed specifications of various components of the tape traveling system in accordance with the present invention are shown in FIG. 7 and Table 1. Reference characters a to l in FIG. 7 correspond to the reference characters a to l of respective components in Table 1.

parallel to the reference plane of the cassette from tape cassette 1, lead 3a has only to be positioned, for the entire region, lower than the position which is higher than the lower end of magnetic tape 2 contained in tape cassette 1 by the elevation of pole bases caused by tape tension, and intersection with magnetic tape 2 and lead 3a at the time of loading and unloading of magnetic tape 2 can be prevented and the object of the present invention can be attained.

Figure 4A:
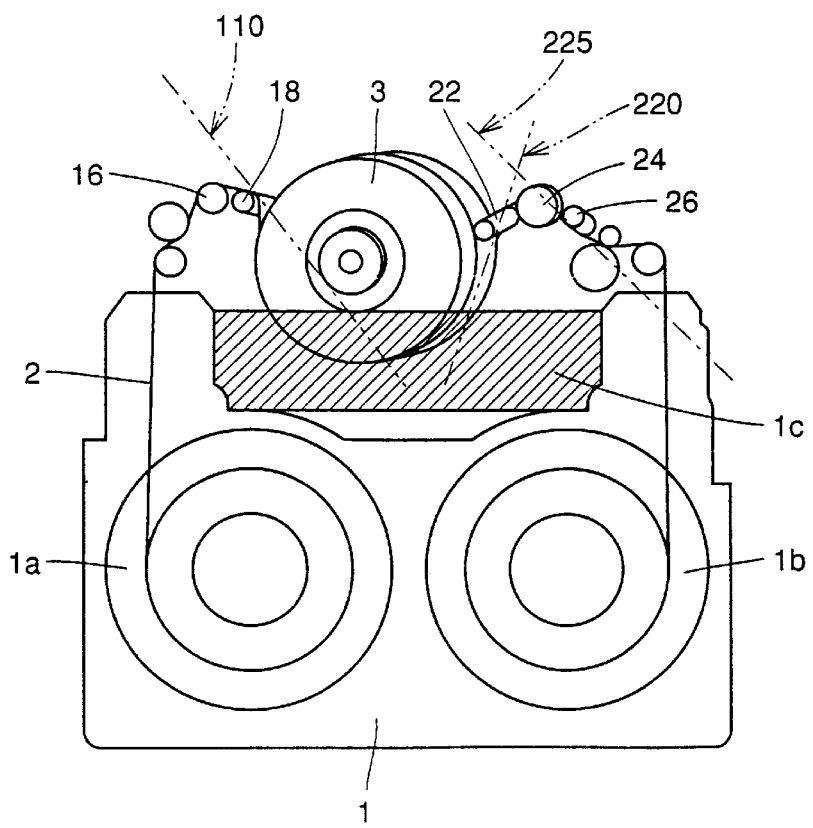
FIG. 4A is a plan view showing a structure of one modification of the embodiment of the present invention in which tape cassette is attached with the rotary head drum entering a cassette mouth of the tape cassette.
Figure 4B:
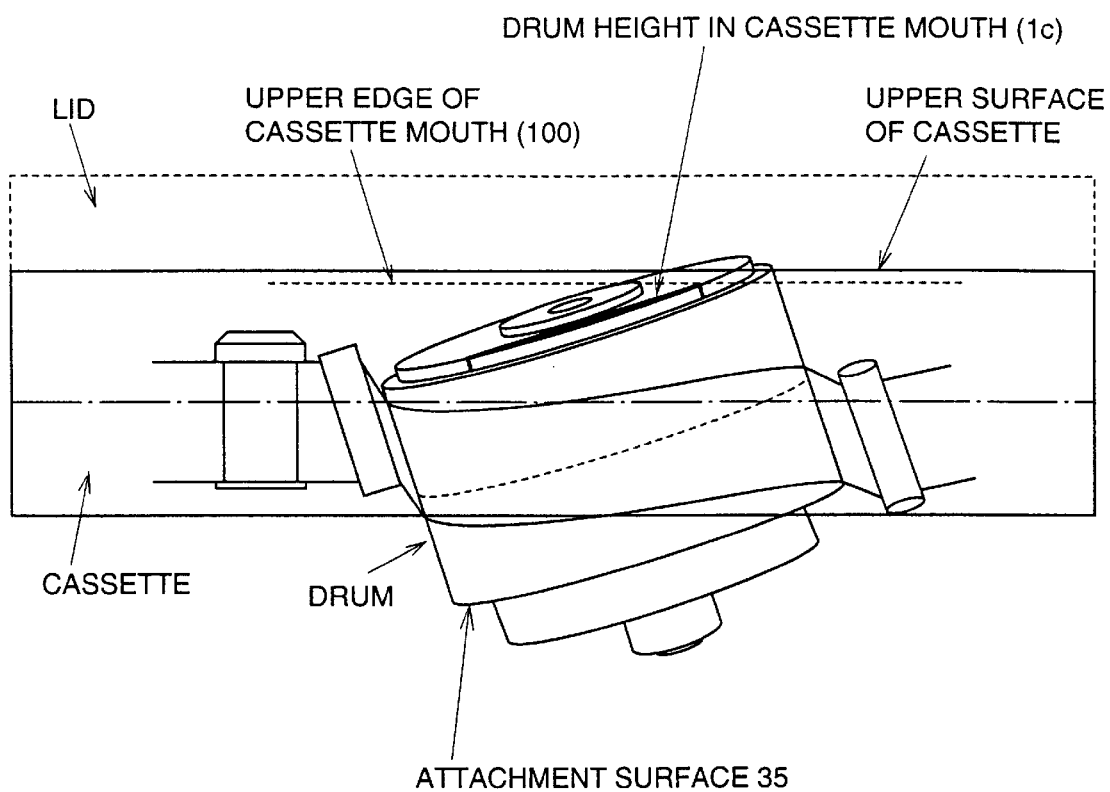
FIG. 4B shows a horizontal view of FIG. 4A.

As a modification of the present invention, it is possible to further increase the angle of inclination of rotary head drum 3 to the side of the tape cassette 1 so as to lower the attachment surface 35 of rotary head drum 3, and therefore the height of rotary head drum 3 as a whole can be made lower than the height of tape cassette 1, as shown in FIG. 4B. The attachment surface 35 is lower than an upper edge 100

TABLE 1

| | Guide | R | X | Y | Z | angle of inclination | direction of inclination | winding angle | pitch |
|---|---|---|---|---|---|---|---|---|---|
| a | S. reel base | 5.85–14.5 | −16.250 | 0.000 | 0.000 | 0.000 | — | — | |
| b | Tension roller | 1.75 | −24.608 (−21.841) | 32.750 (32.515) | 0.000 | 0.000 | — | 50.8–65.0 (16.1–51.5) | 31.303–33.550 |
| c | S1 roller | 2.25 | −24.500 | 37.500 | 0.000 | 0.000 | — | 49.300 (36.082) | 2.564 |
| d | Entrance guide roller | 1.90 | −18.707 | 47.148 | 0.000 | 0.000 | — | 94.600 | 10.460 |
| e | Entrance inclined guide | 1.00 | −14.124 | 46.933 | 0.000 | 17.276 | 166.057 | 82.115 | 4.550 |
| f | Drum | 10.85 | −2.000 | 41.000 | −0.800 | 18.000 | −167.000 | 180.000 | 5.125 |
| g | Exit 1st inclined guide | 1.00 | 10.482 | 44.890 | 0.406 | 21.566 | −146.833 | 50.000 | 5.000 |
| h | Exit guide roller | 1.90 | 14.919 | 47.000 | −0.074 | 4.876 | 157.630 | 113.825 | 4.500 |
| i | Exit 2nd inclined guide | 1.00 | 18.970 | 42.077 | 0.000 | 13.717 | 122.416 | 20.669 | 5.653 |
| j | Capstan | 1.00 | 22.000 | 37.300 | 0.000 | 0.000 | — | 33.262 | 5.657 |
| k | TU guide | 1.50 | 24.600 | 33.381 | 0.000 | 0.000 | — | 57.527–72.459 | 3.983 |
| l | T. reel base | 5.85–14.5 | 16.250 | 0.000 | 0.000 | 0.000 | — | — | 31.860–34.134 |

Figure 3:
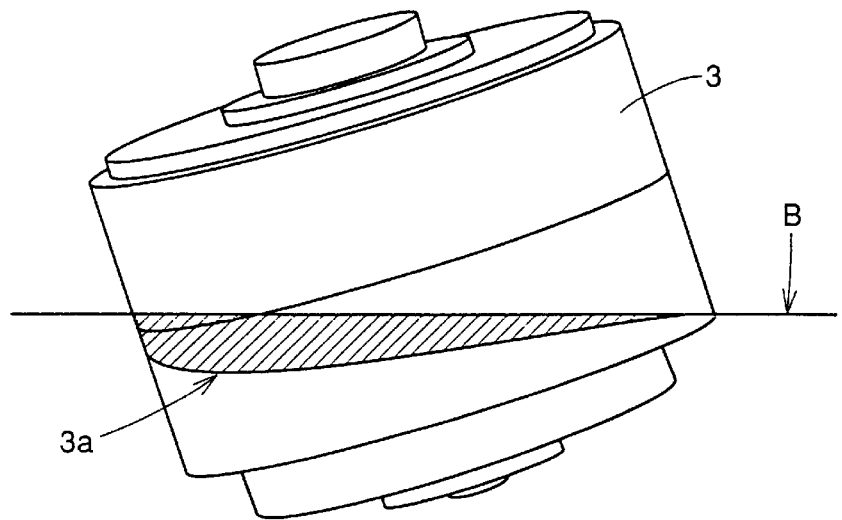
FIG. 3 is an illustration showing positional relationship between the lead and the moving region of the lower end of the magnetic tape at the time of loading and unloading, of the tape traveling system in accordance with the embodiment of the present invention shown in FIG. 1.

In the tape traveling system of the present embodiment, the positional relation of the lower end of magnetic tape 2 when accommodated in tape cassette 1 (denoted by the arrow B in FIG. 3), the region of the lower end of magnetic tape 2 which moves at the time of loading and unloading (hatched portions of FIG. 3) and lead 3a are as shown in FIG. 3. More specifically, at the time of loading and unloading of magnetic tape 2, the lower end of magnetic tape 2 does not intersect lead 3a. Therefore, the lower end of magnetic tape 2 will never be in contact with the edge of lead 3a. Even when the magnetic tape 2 is loaded and unloaded in a direction approximately parallel to the reference plane of the cassette by the first inclined guide 22 on the take up side and guide roller 24 on the take up side, pinching of magnetic tape 2 between upper flange of guide roller on the take up side and the lead 3a of rotary head drum 3 possibly damaging the lower end of magnetic tape 2, can be prevented.

Figure 5:
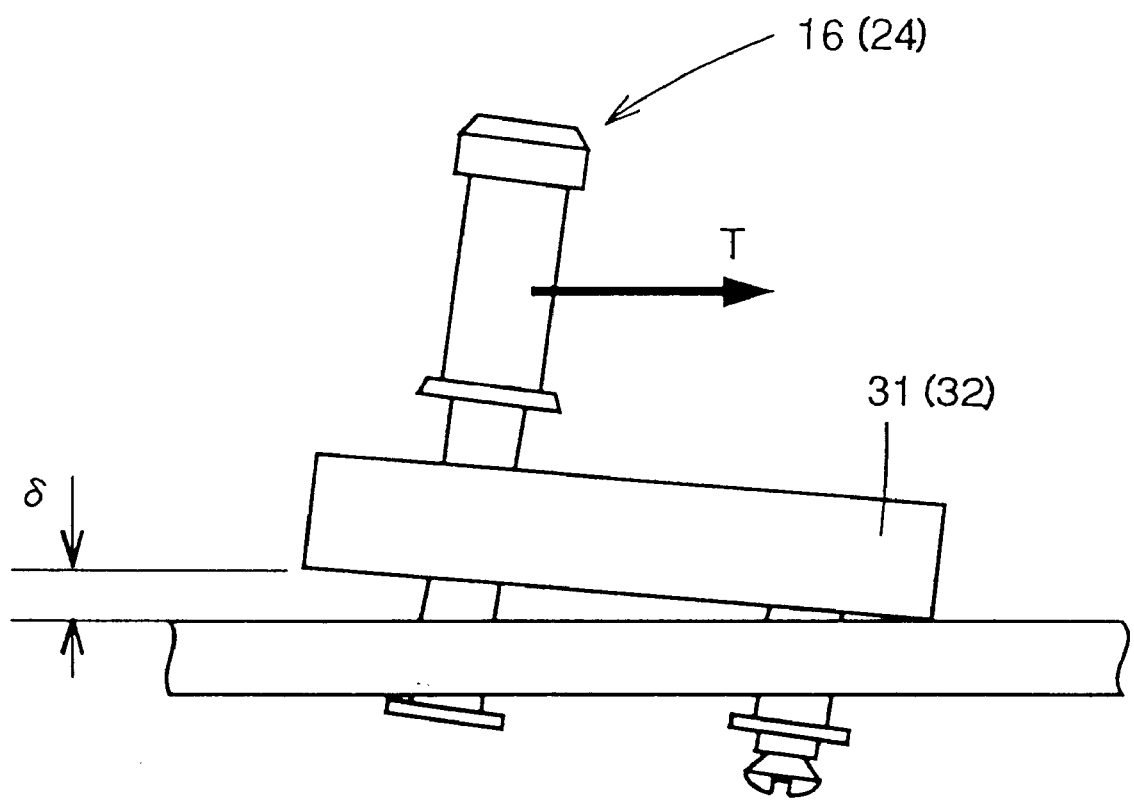
FIG. 5 is an illustration showing elevation of the pole bases derived from the play in attachment of the pole base and from the tape tension at the time of loading and unloading of the magnetic tape.

In the present embodiment, lead 3a is positioned lower, over the entire region, than the plane provided by the lower end of magnetic tape 2 accommodated in the tape cassette. However, the object of the present invention is attained not only with this position of lead 3a. More specifically, the tape traveling system may be structured such that at the time of loading and unloading of magnetic tape 2, the lower end of magnetic tape 2 is positioned higher than lead 3a over the entire region of lead 3a while the tape 2 is wound around and in sliding contact with the outer peripheral surface of rotary head drum 3. For example, at the time of loading and unloading of magnetic tape 2, pole bases 31 and 32 on the supply side and the take up side rise by about 0.1 to 0.3 mm as shown in FIG. 5 with a letter "δ" because of the play as there is tape tension "T" of magnetic tape 2. Therefore, when magnetic tape 2 is loaded and unloaded approximately of a cassette mouth 1c, and thus lower than the opened cassette lid (if the cassette has such a lid). Therefore, referring to FIG. 4A, it becomes possible to load and unload the magnetic tape while tape cassette 1 is attached with rotary head drum 3 entered in a cassette mouth 1c (hatched portion of FIG. 4A) of tape cassette 1, thus the depth of the mechanism can further be reduced. FIG. 4B shows the viewpoint of the tape cassette, whose height 100 is above the rotary drum 3.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetic recording reproducing apparatus, for use with a tape cassette, comprising:

a rotary head drum including a rotating portion having a magnetic head for, in use, recording and reproducing on a magnetic tape traveling from a mounted tape cassette, and a fixed portion having a lead for guiding a lower edge of the traveling magnetic tape;

a supply side tape guide group and a take up side tape guide group provided on a magnetic tape supply side and a take up side of said rotary head drum for winding the magnetic tape around a prescribed angle of an outer peripheral surface of said rotary head drum, the prescribed angle being the proportion of the outer peripheral surface contacting the magnetic tape when loaded;

said supply side tape guide group including a supply side guide roller and a supply side inclined guide, arranged in that order when considered in a direction of travel of the tape during recording and reproducing;

said take up side tape guide group including a first take up side inclined guide, a take up guide roller, and a second take up side inclined guide, arranged in that order when considered in the direction of travel of the tape during recording and reproducing;

a supply side pole base for supporting said supply side tape guide group;

a take up side pole base for supporting said take up side tape guide group; and a guide rail formed such that said supply side and take up side pole bases are moved along a path which lies in a plane approximately parallel a plane formed by the center line of the magnetic tape when accommodated in the mounted tape cassette, at the time of tape loading, wherein said lead guides the lower edge of the traveling magnetic tape by contact over the entire prescribed angle and is, in its entirety, lower than the position of the lower edge of the magnetic tape at loading and unloading of the magnetic tape, by having a rotation axis of said rotary head drum inclined in a direction toward the tape cassette, and said lead is, in its entirety, lower than a plane formed by the lower edge of the magnetic tape when the magnetic tape is contained in the tape cassette before and after unloading.

2. The magnetic recording reproducing apparatus according to claim 1, wherein said supply side and take up side pole bases elevate by an elevation amount at loading and unloading of the magnetic tape due to a tape tension, said lead being, in its entirety, lower than a first position, the first position being defined as being higher than the position of the lower edge of the magnetic tape, when the magnetic tape is accommodated in the tape cassette before loading and after unloading, by the elevation amount.

3. The magnetic recording reproducing apparatus according to claim 1, wherein while the magnetic tape is wound around and in sliding contact with the outer peripheral surface of said rotary head drum at the time of loading and unloading of the magnetic tape, the lower edge of the magnetic tape contacting the outer peripheral surface is positioned entirely above said lead.

4. The magnetic recording reproducing apparatus according to claim 1, wherein the rotation axis of said rotary head drum is inclined by a prescribed angle toward a side facing the cassette.

5. The magnetic recording reproducing apparatus according to claim 1, wherein angle of inclination of said rotary head drum is set such that a portion of said rotary head drum is located in a mouth of the mounted tape cassette and set lower than an upper edge of the cassette mouth.

6. The recording reproducing apparatus according to claim 5, wherein said rotary drum lies in a location occupied by a mouth of an attached tape cassette.

7. The magnetic recording reproducing apparatus according to claim 1, wherein:

said supply side guide roller changes a travel direction of the magnetic tape and maintains height of traveling, and said supply side inclined guide inclines the magnetic tape so that the magnetic tape moving away from the tape cassette can be wound around said rotary head drum, said supply side pole base supports said supply side guide roller and said supply side inclined guide, said take up guide roller changes direction of travel of the magnetic tape and maintains height of traveling, and said first take up side inclined guide changes angle of inclination of the magnetic tape to an inclined state, said take up side pole base supports said take up guide roller and said first take up side inclined guide, said first take up side inclined guide is arranged at a position where the magnetic tape is wound around immediately after the tape moves away from said rotary head drum, with the magnetic tape wound around the rotary head drum, and said second take up side inclined guide returns the magnetic tape traveling in the inclined state to a state allowing accommodation in the tape cassette.

8. The magnetic recording reproducing apparatus according to claim 7, wherein said second take up side inclined guide contacts a magnetic recording surface of the magnetic tape.

9. The magnetic recording reproducing apparatus according to claim 7, wherein said supply side tape guide group consists of said supply side guide roller and said supply side inclined guide; and said take up side tape guide group consists of said take up guide roller, said first take up side inclined guide, and said second take up side inclined guide.

10. A magnetic recording reproducing apparatus, for use with a tape cassette, comprising:

a rotary head drum including a rotating portion having a magnetic head for, in use, recording and reproducing on a magnetic tape traveling from a mounted tape cassette, and a fixed portion having a lead for guiding a lower edge of the traveling magnetic tape;

a supply side tape guide group and a take up side tape guide group provided on a magnetic tape supply side and a take up side of said rotary head drum for winding the magnetic tape around a prescribed angle of an outer peripheral surface of said rotary head drum, the prescribed angle being the proportion of the outer peripheral surface contacting the magnetic tape when loaded;

said supply side tape guide group including a supply side guide roller and a supply side inclined guide, arranged in that order when considered in a direction of travel of the tape during recording and reproducing;

said take up side tape guide group including a first take up side inclined guide, a take up guide roller, and a second take up side inclined guide, arranged in that order when considered in the direction of travel of the tape during recording and reproducing;

a supply side pole base for supporting said supply side tape guide group;

a take up side pole base for supporting said take up side tape guide group; and a guide rail formed such that said supply side and take up side pole bases are moved, at the time of tape loading, in a direction approximately parallel to a reference plane which is a plane formed by the center line of the magnetic tape when the tape is accommodated in the mounted tape cassette; wherein said lead guides the lower edge of the traveling magnetic tape by contact over the entire prescribed angle and is, in its entirety, lower than a plane formed by the lower edge of the magnetic tape when the magnetic tape is contained in the mounted tape cassette before loading and after unloading.

11. The magnetic recording reproducing apparatus according to claim 10, wherein said guide rail is formed such that said supply side and take up side pole bases are moved along a path which lies in a plane approximately parallel to the plane formed by the center line of the magnetic tape when the tape is accommodated in the mounted tape cassette.

12. The magnetic recording reproducing apparatus according to claim 2, wherein said supply side guide roller changes a travel direction of the magnetic tape and maintains height of traveling, and said supply side inclined guide inclines the magnetic tape so that the magnetic tape moving away from the tape cassette can be wound around said rotary head drum, said supply side pole base supports said supply side guide roller and said supply side inclined guide, said take up guide roller chances direction of travel of the magnetic tape and maintains height of traveling, and said first take up side inclined guide changes angle of inclination of the magnetic tape to an inclined state, said take up side pole base supports said take up guide roller and said first take up side inclined guide, said first take up side inclined guide is arranged at a position where the magnetic tape is wound around immediately after the tape moves away from said rotary head drum, with the magnetic tape wound around the rotary head drum, and said second take up side inclined guide returns the magnetic tape traveling in the inclined state to a state allowing accommodation in the tape cassette.

13. The magnetic recording reproducing apparatus according to claim 12, wherein:

said supply side tape guide group consists of said supply side guide roller and said supply side inclined guide; and said take up side tape guide group consists of said take up guide roller, said first take up side inclined guide, and said second take up side inclined guide.

14. A recording reproducing apparatus, for use with a tape cassette, comprising:

a rotary head drum including a head for, in use, recording and reproducing on a tape from a mounted tape cassette, and a lead for guiding a lower edge of the tape;

a supply side tape guide group and a take up side tape guide group provided on a tape supply side and a take up side of said rotary head drum for winding the tape around a prescribed angle of an outer peripheral surface of said rotary head drum, the prescribed angle being the proportion of the outer peripheral surface contacting the tape when loaded;

said supply side tape guide group including a guide portion which moves at loading and unloading of the tape;

a supply side pole base for supporting said guide portion;

said take up side guide group including a guide member which moves at loading and unloading of the tape; and a take up side pole base for supporting said guide member;

a guide rail formed such that said supply side and take up side pole bases are moved in a direction approximately parallel to a reference plane of the cassette, which is a plane formed by the center line of the tape accommodated in the tape cassette, at the loading and unloading of the tape;

wherein said lead guides the lower edge of the tape by contact over substantially all of the prescribed angle, and a position of said lead is, in its entirety, lower than a first position, the first position being defined as being higher than a position of the lower edge of the magnetic tape, when the magnetic tape is accommodated in the tape cassette before loading and after unloading, by an elevation amount, the elevation amount being equal to an elevation of said supply side and take up side pole bases caused by tape tension at loading and unloading of the tape.

15. The recording reproducing apparatus according to claim 14, wherein said rotary head drum is inclined by a prescribed amount toward a side facing the cassette.

16. The recording reproducing apparatus according to claim 15, wherein angle of inclination of said rotary head drum is set such that a portion of said rotary head drum is located in a mouth of the mounted tape cassette and set lower than an upper edge of the cassette mouth.

17. The recording reproducing apparatus according to claim 16, wherein said rotary drum lies in a location occupied by a mouth of an attached tape cassette.

18. The recording reproducing apparatus according to claim 14, wherein said rotary head drum is inclined by a prescribed amount toward the tape cassette.

19. The recording reproducing apparatus according to claim 14, wherein said lead is, in its entirety, lower than a plane formed by the lower edge of the magnetic tape when the magnetic tape is contained in the tape cassette before loading and after unloading.

20. The recording reproducing apparatus according to claim 14, wherein said guide rail is formed such that said supply side and take up side pole bases are moved, at the time of tape loading, along a path which lies in a plane approximately parallel to a plane formed by the center line of the magnetic tape when the magnetic tape is accommodated in the mounted tape cassette.

* * * * *